US011391959B2

(12) United States Patent
Kokubun et al.

(10) Patent No.: US 11,391,959 B2
(45) Date of Patent: Jul. 19, 2022

(54) LASER ILLUMINATION SYSTEM WITH CLOSELY SPACED BEAMS

(71) Applicant: BAE Systems Information and Electronic Systems Integration Inc., Nashua, NH (US)

(72) Inventors: Daniel N. Kokubun, Waipahu, HI (US); Mark Branham, Trafalgar, IN (US); Sidney Pang, Kaneohe, HI (US); Mark Segawa, Wahiawa, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 345 days.

(21) Appl. No.: 16/546,758

(22) Filed: Aug. 21, 2019

(65) Prior Publication Data

US 2021/0055567 A1    Feb. 25, 2021

(51) Int. Cl.
*G02B 27/10* (2006.01)
*G02B 27/48* (2006.01)

(52) U.S. Cl.
CPC ........... *G02B 27/108* (2013.01); *G02B 27/48* (2013.01)

(58) Field of Classification Search
CPC ............................. G02B 27/108; G02B 27/48

USPC ......................................................... 359/629
See application file for complete search history.

(56) References Cited

U.S. PATENT DOCUMENTS

2010/0220318 A1*  9/2010  Moll ..................... G02B 6/124
                                                        385/33

* cited by examiner

*Primary Examiner* — Marin Pichler
*Assistant Examiner* — Mitchell T Oestreich
(74) *Attorney, Agent, or Firm* — Finch & Maloney PLLC; Scott J. Asmus

(57) ABSTRACT

Techniques are provided for laser illumination employing closely spaced laser beams. A system implementing the techniques according to an embodiment includes a semi-cylindrical optical block comprising a curved surface and a planar surface. The system further includes two laser sources configured to direct first and second laser beams to the curved surface, such that the first laser beam enters and exits the block parallel to and offset from the planar surface by a selected translation distance, and the second laser beam enters the block at a critical angle relative to the planar surface. The critical angle is associated with total internal reflection of the second laser beam along the planar surface, such that the second laser beam exits the block parallel to, and separated from, the first laser beam exiting the optical block. The separation of the exiting first and second laser beams is controlled by the selected translation distance.

10 Claims, 7 Drawing Sheets

LASER ILLUMINATION SYSTEM WITH CLOSELY SPACED BEAMS

STATEMENT OF GOVERNMENT INTEREST

This invention was made with United States Government assistance under Contract No. N00014-16-C-3039, awarded by the United States Navy. The United States Government has certain rights in this invention.

FIELD OF DISCLOSURE

The present disclosure relates to laser illumination, and more particularly, to a system for laser illumination employing two closely space laser beams.

BACKGROUND

There exist applications, such as mine detection, for example, which utilize pairs of closely spaced laser beams. For these applications, the laser beams generally need to be parallel to each other but separated by a distance that is less than the diameter of each individual laser beam. This is difficult to achieve with conventional optics. Some systems might use polarizers and wave plates to separate and reposition the beams, but this approach would result in at least a fifty percent loss in beam energy. Other systems might attempt to exploit a Kerr effect or Pockels effect mechanism, but these approaches are complex and expensive, requiring precise timing control. Additionally, they would not permit the beams to be active simultaneously, which significantly limits their usefulness for many applications.

Figure 1:
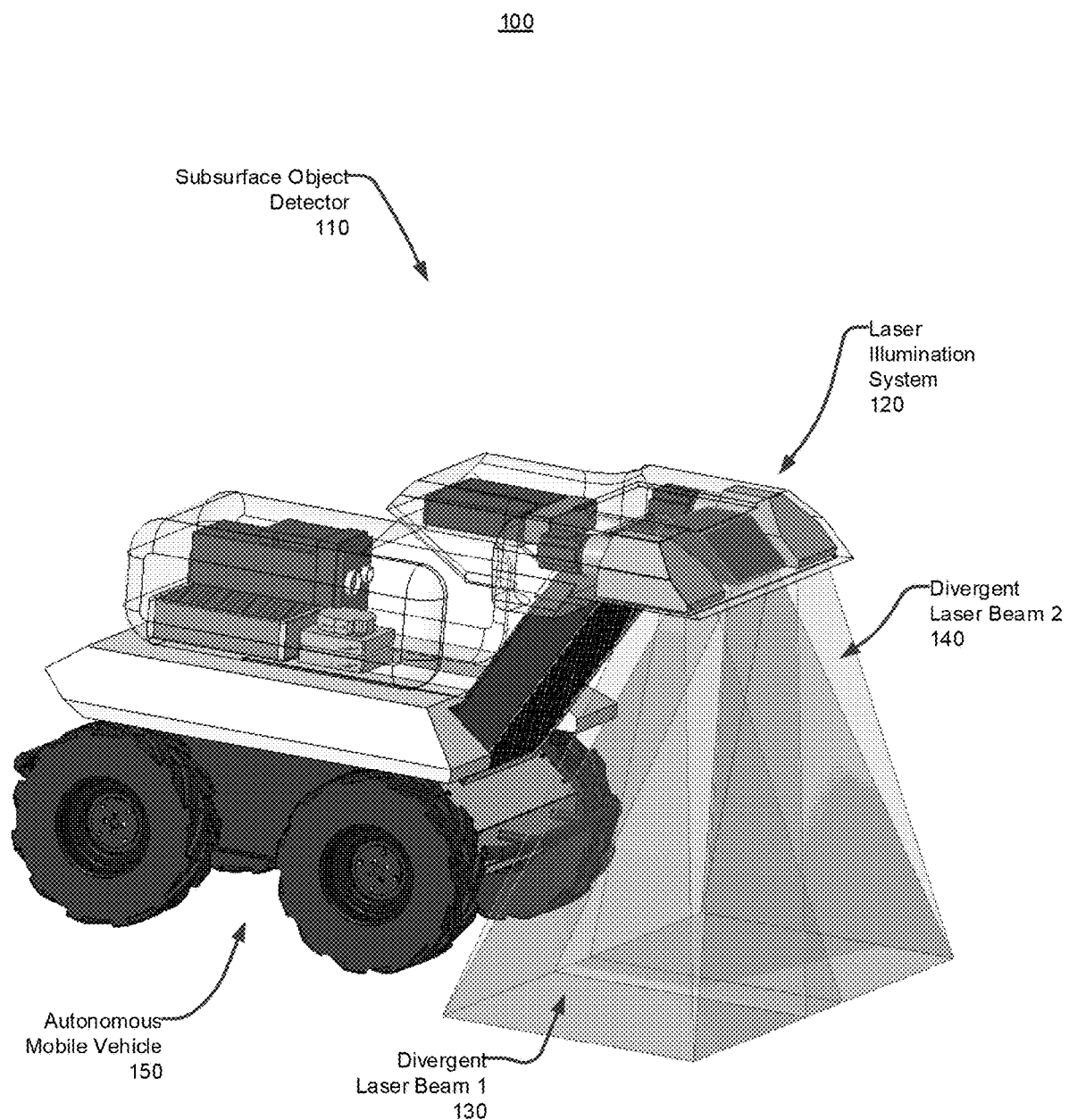
FIG. 1 illustrates an application of a laser illumination system employing closely spaced beams, configured in accordance with certain embodiments of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for the generation of closely spaced laser beams for a laser illumination system. The closely spaced beams generated by the disclosed systems are parallel to each other and separated by a distance that is less than or equal to the diameter of each individual laser beam. In some embodiments, the resulting beams may be colinear or overlap to some extent. This close spacing of the generated beams is achieved even though the laser sources are permitted to be relatively widely separated, for example, to accommodate the physical size constraints of the laser generating equipment and optics. According to an embodiment of the present disclosure, an illumination system is provided that includes two laser sources that are independently positioned and oriented to direct laser beams towards a semi-cylindrical refractive optical block. The angles and entry points of the laser beams into the optical block are adjusted, relative to critical angles associated with (e.g., causing) total internal reflection by the optical block, such that the laser beams exit the block along desired parallel and closely spaced paths, as will be described in greater detail below.

In accordance with another embodiment, a methodology to implement these techniques includes directing a first laser beam to a curved surface of a semi-cylindrical refractive optical block, the optical block comprising the curved surface and a planar surface. The first laser beam is directed to enter and exit the optical block parallel to the planar surface and offset from the planar surface by a selected translation distance. The methodology further includes directing a second laser beam to the curved surface such that the second laser beam enters the optical block at a critical angle relative to the planar surface. The critical angle is associated with (e.g., causes) total internal reflection of the second laser beam along the planar surface, such that the second laser beam exits the optical block parallel to, and separated from, the path of the first laser beam exiting from the optical block. The desired separation of the exiting laser beams is based on the selected translation distance.

In accordance with yet another embodiment, a methodology to implement these techniques includes directing the first laser beam to the planar surface of the semi-cylindrical refractive optical block such that the first laser beam enters the optical block at a first angle that exceeds a critical angle, relative to the planar surface. The critical angle is associated with (e.g., causes) total internal reflection, such that the first laser beam is refracted through and exits the optical block. The methodology further includes directing the second laser beam to the curved surface such that the second laser beam enters the optical block at a second angle that exceeds the critical angle, relative to the planar surface. The second laser beam is thus reflected off the planar surface and exits the optical block parallel to, and separated from, the path of the first laser beam exiting from the optical block. The desired separation of the exiting laser beams is based on a location of the entry of the first laser beam into the optical block.

It will be appreciated that the techniques described herein may provide an improved methodology for generating closely spaced laser beams, compared to other possible techniques such as those that necessitate polarizers, resulting in significant energy loss, or which utilize complex and costly precision timing equipment that does not permit both laser beams to be simultaneously active. The disclosed techniques can generate parallel, simultaneously active, laser beams at separation distances smaller than the beamwidth of the laser beams. These closely spaced laser beams may be used in a wide variety of laser illumination systems including motion compensation systems for autonomous subsurface object detection systems. Other applications will be apparent.

As will be further appreciated, the phrase "parallel to" as used herein does not necessitate a perfectly in-perpetuity parallel relationship between the spaced laser beams. Rather, the beams are sufficiently parallel for the application at hand, meaning that the beams maintain the closely spaced relationship for the beam travel distance of interest for the given application, without intersecting or diverging to an out-of-spec separation distance. While such closely spaced beams may be sufficiently parallel for the given application and the travel distances involved, the beams may eventually intersect or diverge to a spacing that is out of spec for the given application, if allowed to travel greater distances.

System Architecture

FIG. 1 illustrates an application of a laser illumination system 120 employing closely spaced beams, configured in accordance with certain embodiments of the present disclosure. The application in this example is a subsurface object detector 110, which may be used to detect mines or other buried objects of interest. As shown in this example, the subsurface object detector 110 is integrated with an autonomous mobile vehicle 150 which employs closely spaced divergent laser beams 130, 140 for motion compensation. The motion compensation may be performed using any suitable techniques in light of the present disclosure. Laser illumination system 120 is configured to generate the closely spaced divergent laser beams 130, 140, as will be explained in greater detail below. It will be appreciated that the subsurface object detector 110 is provided as one example use of the laser illumination system 120, and that other applications will be apparent.

Figure 2:
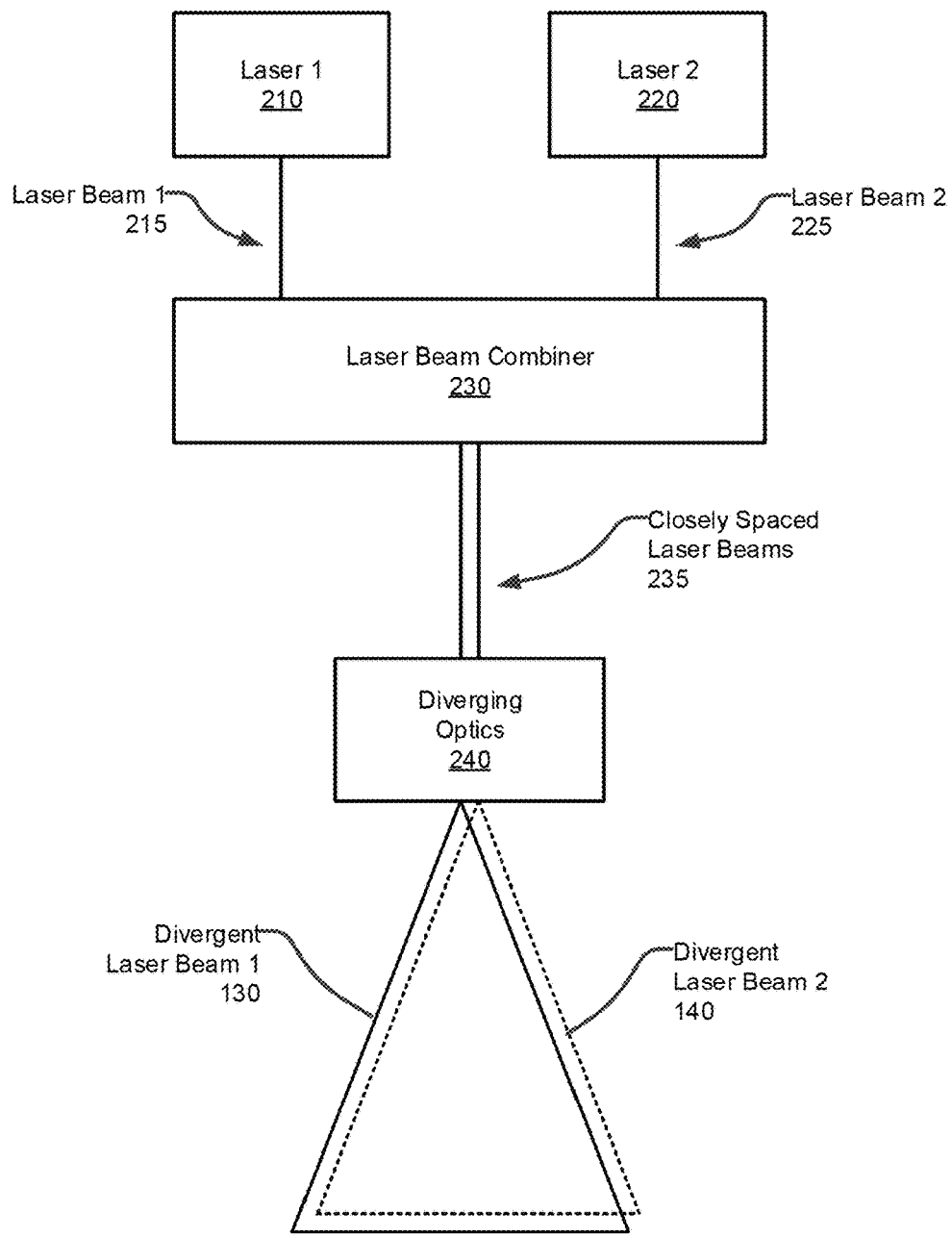
FIG. 2 is a schematic diagram of the laser illumination system employing closely spaced beams, configured in accordance with certain embodiments of the present disclosure.

FIG. 2 is a schematic diagram of the laser illumination system 120 employing closely spaced beam, configured in accordance with certain embodiments of the present disclosure. The laser illumination system 120 is shown to include a first laser source 210, a second laser source 220, a laser beam combiner 230, and diverging optics 240.

The first and second laser sources 210, 220 are configured to generate first and second laser beams 215, 225 respectively. The laser beams 215 and 225 may be of any desired wavelength, power, and beamwidth, as required for any given application. The positions and orientation angles of laser sources 210 and/or 220 may be adjusted relative to the optical components of laser beam combiner 230, as will be described below. As such, the angles of arrival of laser beams 215 and/or 225 into the optical components of laser beam combiner 230 (as well as the locations of entry) may be controlled. In general, laser beams 215 and 225 may be relatively widely separated to accommodate the limitations imposed by the physical dimensions of the laser sources 210, 220 and associated optics.

Laser beam combiner 230 is configured to adjust the input laser beams 215, 225 to generate closely spaced laser beams 235, as will be described below. In some embodiments, "close" spacing is a separation between the laser beams that is equal to or less than the diameter of the laser beams.

Diverging optics 240 are configured to diverge the closely spaced laser beams 235 into a cone or wedge-shaped beam that spreads out over distance, as illustrated by first and second divergent laser beams 130 and 140. In some embodiments, the divergence is in the range of 15 to 35 degrees. The divergent laser beams 130, 140 illuminate surface areas that may overlap by a selected percentage. In some embodiments, the illuminated surface areas may have a first dimension (e.g., length) in the range of 0.5 meters to 1.0 meters and a second dimension (e.g., width) in the range of 1.0 meters to 2.0 meters.

Figure 3:
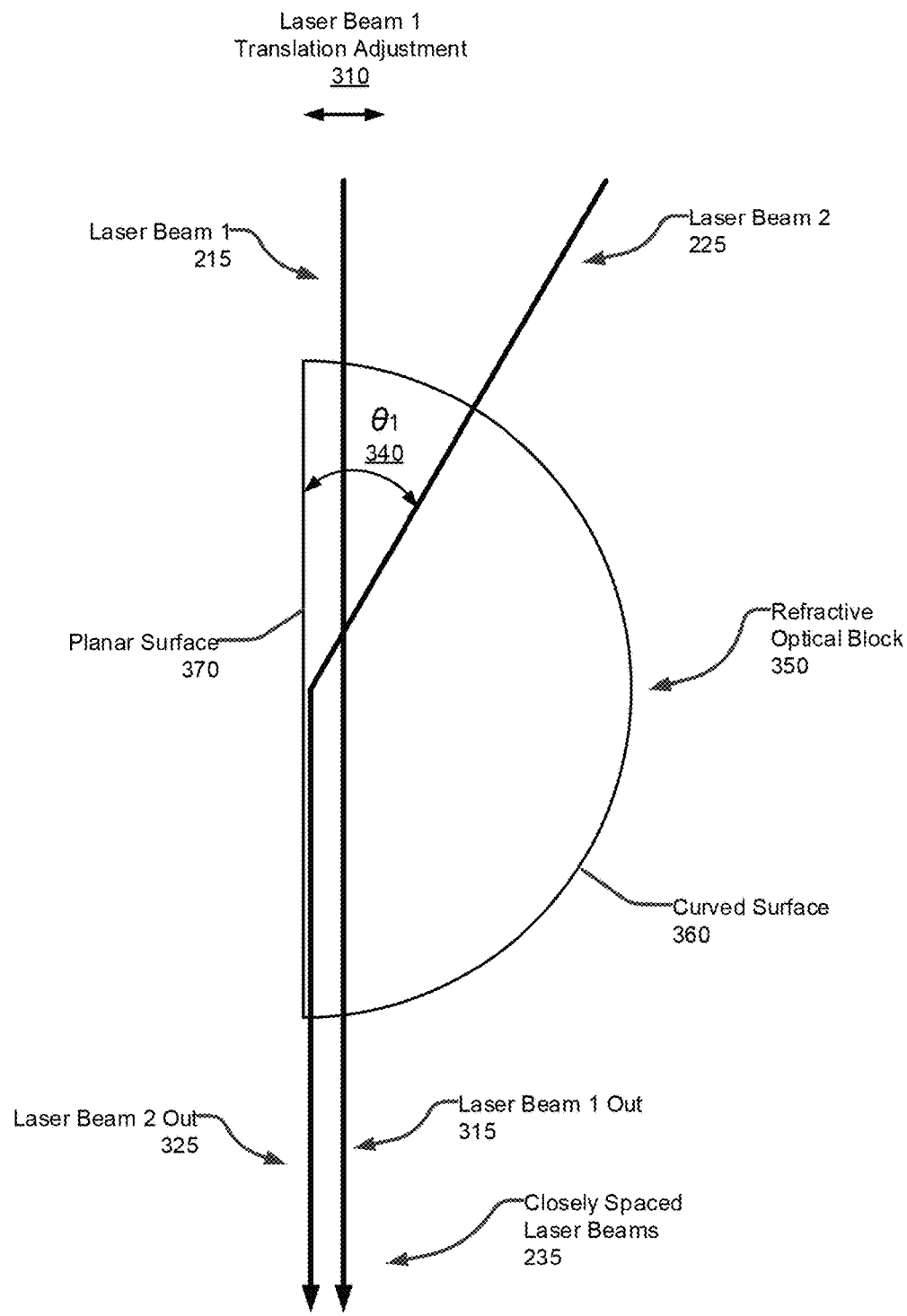
FIG. 3 is a schematic diagram of a laser beam combiner of the laser illumination system shown in FIG. 2, according to an embodiment of the present disclosure.

FIG. 3 is a schematic diagram of a laser beam combiner 230a, configured in accordance with certain embodiments of the present disclosure. The laser beam combiner 230a is a semi-cylindrical refractive optical block 350 comprising a curved surface 360 and a planar surface 370.

The first laser source 210 is positioned and oriented such that the first laser beam 215 is directed to the curved surface of the optical block 350, as shown, and enters the optical block parallel to the planar surface 370 and offset from the planar surface by a selected translation distance determined by laser beam 1 translation adjustment 310. In some embodiments, the laser illumination system 120 may include movable mounting mechanisms configured to secure the laser sources 210, 220 in a desired adjustable position and angle such that, for example, the offset of laser beam 215 from the planar surface may be adjusted to a selected translation distance. The first laser beam 215 is shown to exit the optical block, as first laser beam out 315, remaining parallel to the planar surface and at the same offset.

The second laser source 220 is positioned and oriented such that the second laser beam 225 is directed to the curved surface of the optical block 350, as shown, and enters the optical block at a critical angle $\theta_1$ 340 relative to the planar surface 370. The critical angle is associated with total internal reflection of the second laser beam along the planar surface, as shown. This results in the second laser beam exiting the optical block (second laser beam out 325) parallel to, and separated from, the first laser exiting the optical block (first laser beam out 315). The separation of the resulting closely spaced laser beams 235 that exit the optical block is based on the selected translation distance and can be adjusted to less than the diameter of the first or second laser beams, or to any desired value. In some embodiments, the closely spaced laser beams 235 may be colinear (e.g., substantially no separation between them).

Figure 4:
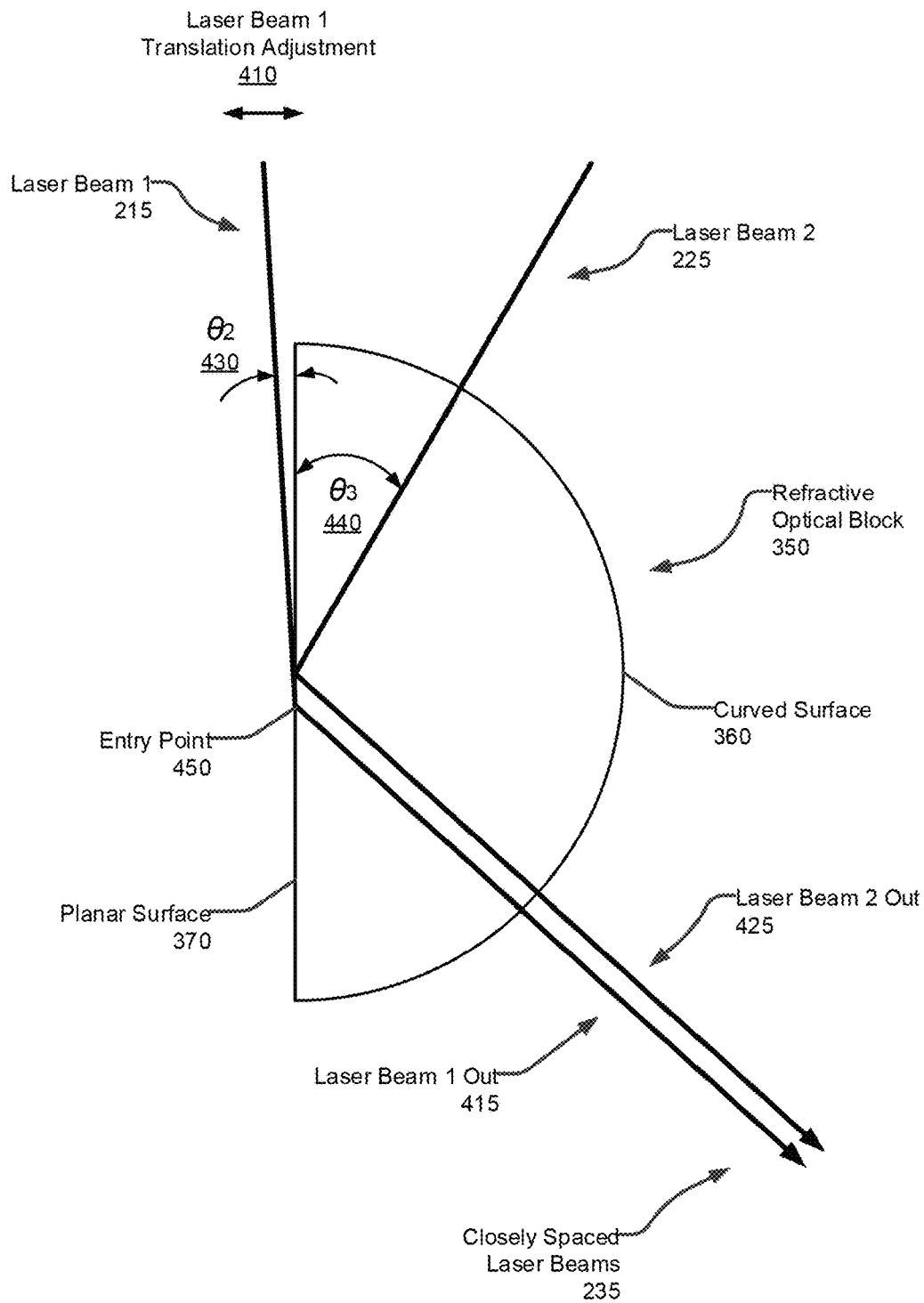
FIG. 4 is a schematic diagram of a laser beam combiner of the laser illumination system shown in FIG. 2, according to another embodiment of the present disclosure.

FIG. 4 is a schematic diagram of a laser beam combiner 230b, configured in accordance with certain other embodiments of the present disclosure. The laser beam combiner 230b employs the same semi-cylindrical refractive optical block 350, comprising a curved surface 360 and a planar surface 370.

The first laser source 210 is positioned and oriented such that the first laser beam 215 is directed to the planar surface 370 of the optical block 350, as shown, and enters the optical block at entry point 450, at an angle $\theta_2$ 430 that exceeds the critical angle associated with total internal reflection relative to the planar surface 370. This causes the first laser beam 215 to be refracted through the optical block, as shown, and to exit as laser beam 1 out 415.

In some embodiments, the laser illumination system 120 may include movable mounting mechanisms configured to secure the laser sources 210, 220 in a desired adjustable position and angle such that, for example, the first laser beam 215 may be adjusted to a selected translation distance 410 causing the laser beam to enter the block at a higher or lower point relative to the illustrated entry point 450, thus shifting the laser beam 1 out 415 relative to the laser beam 2 out 425, to any desired spacing.

The second laser source 220 is positioned and oriented such that the second laser beam 225 is directed to the curved surface of the optical block 350, as shown, and enters the optical block at an angle $\theta_3$ 440 that exceeds the critical angle associated with total internal reflection relative to the planar surface 370. This results in a reflection of the second laser beam 225 off of the planar surface 370 causing the beam to exit the optical block (as laser beam 2 out 425) parallel to, and separated from, laser beam 1 out 415. The separation of the resulting closely spaced laser beams 235 that exit the optical block is based on the location of the entry of the first laser beam 215 into the optical block and can be adjusted to less than the diameter of the first or second laser beams, or to any desired value. In some embodiments, the closely spaced laser beams 235 may be colinear (e.g., substantially no separation between them).

Methodology

Figure 5:
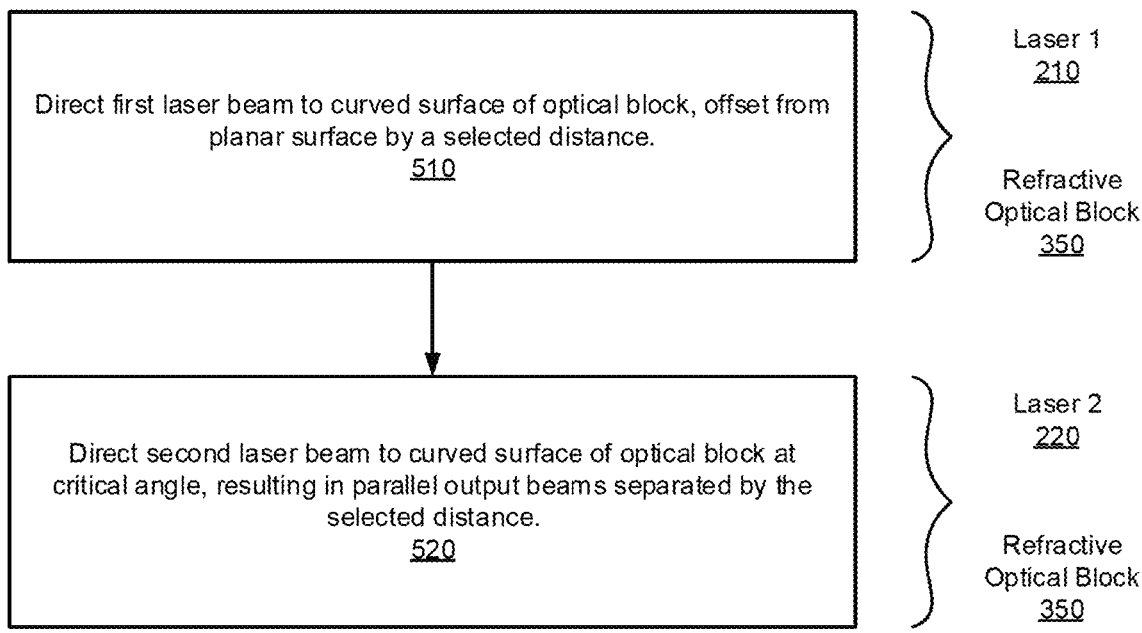
FIG. 5 is a flowchart illustrating a methodology for generating closely spaced laser beams, in accordance with an embodiment of the present disclosure.
Figure 6:
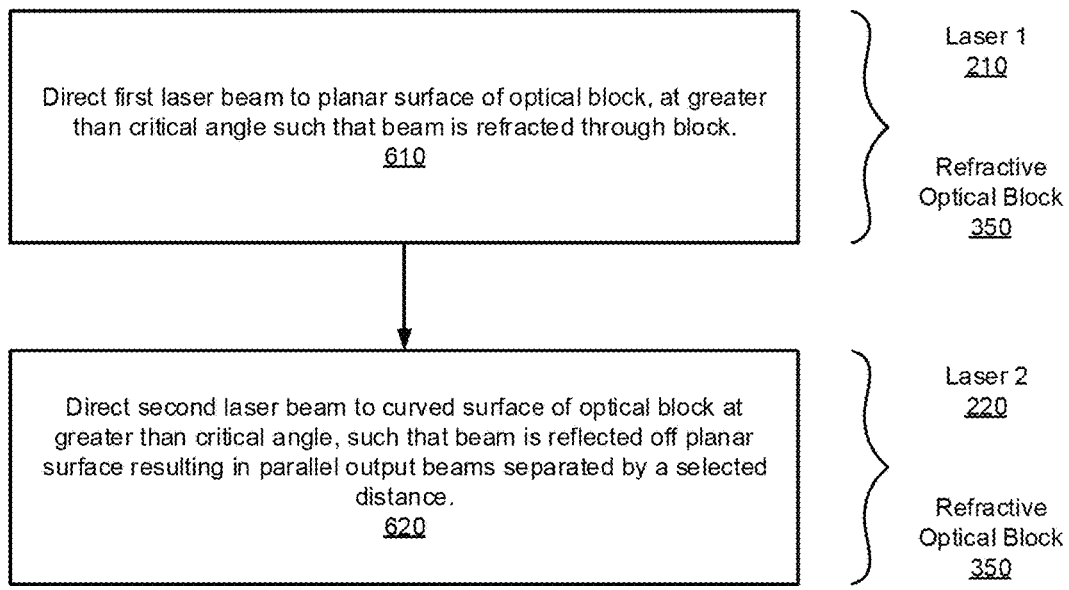
FIG. 6 is a flowchart illustrating a methodology for generating closely spaced laser beams, in accordance with another embodiment of the present disclosure.

FIGS. 5 and 6 are flowchart illustrating methodologies for generating closely spaced laser beams for a laser illumination system, in accordance with certain other embodiments of the present disclosure. As can be seen, example methods 500 and 600 includes a number of phases and sub-processes, the sequence of which may vary from one embodiment to another. However, when considered in the aggregate, these phases and sub-processes form a process for generating closely spaced laser beams, in accordance with certain of the embodiments disclosed herein. These embodiments can be implemented, for example using the system architecture illustrated in FIGS. 2-4, as described above. However other system architectures can be used in other embodiments, as will be apparent in light of this disclosure. To this end, the correlation of the various functions shown in FIGS. 5 and 6 to the specific components illustrated in FIGS. 2-4 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 5, in one embodiment method 500 commences, at operation 510, by directing a first laser beam to a curved surface of a semi-cylindrical refractive optical block. The optical block comprises the curved surface and a planar surface. The first laser beam enters the optical block parallel to the planar surface and offset from the planar surface by a selected translation distance. In some embodiments, the offset is achieved by moving the source of the first laser beam, as previously described.

Next, at operation 520, a second laser beam is directed to the curved surface. The second laser beam enters the optical block at a critical angle relative to the planar surface. The critical angle is the angle at which total internal reflection of the second laser beam occurs along the planar surface, such that the second laser beam exits the optical block parallel to, and separated from, the first laser beam exiting the optical block. The separation is based on the selected translation distance. In some embodiments, the separation is less than a diameter of the first laser beam or the second laser beam.

As illustrated in FIG. 6, in another embodiment method 600 commences, at operation 610, by directing a first laser beam to the planar surface of the semi-cylindrical refractive optical block. The first laser beam enters the optical block at a first angle that exceeds the critical angle, relative to the planar surface, such that the first laser beam is refracted through the optical block.

Next, at operation 620, a second laser beam is directed to the curved surface. The second laser beam enters the optical block at a second angle that exceeds the critical angle, relative to the planar surface, such that the second laser beam is reflected off the planar surface and exits the optical block parallel to, and separated from, the first laser beam exiting the optical block. The separation is based on the location of the entry of the first laser beam into the optical block, which may be controlled, in some embodiments, by moving the source of the first laser beam, as previously described.

Of course, in some embodiments, additional operations may be performed, as previously described in connection with the system. These additional operations may include, for example, employing diverging lenses or optics to diverge the exiting first laser beam and the exiting second laser beam. In some embodiments, the divergence is in the range of 15 to 35 degrees.

Example Platforms

Figure 7:
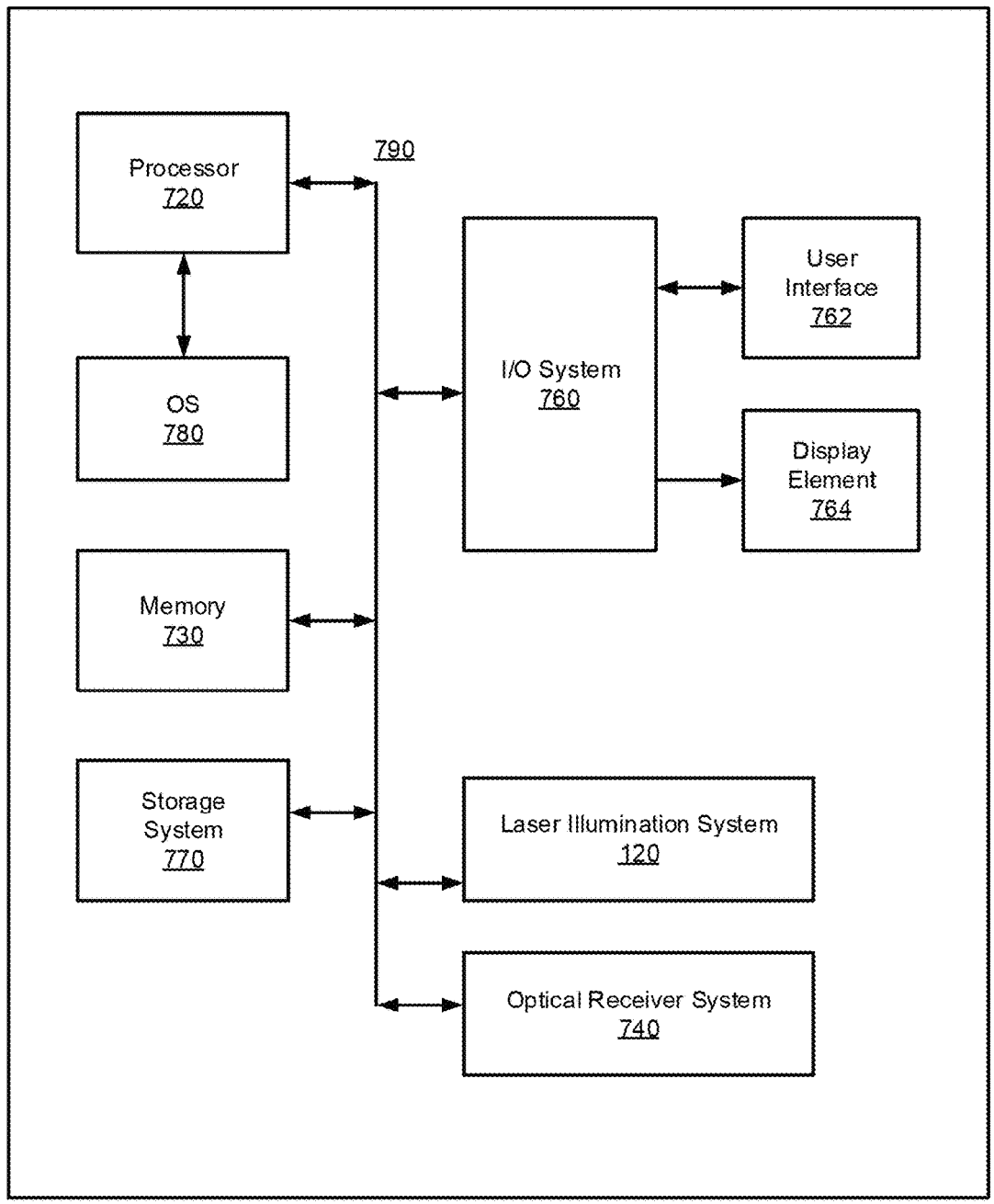
FIG. 7 is a block diagram schematically illustrating a platform employing the disclosed laser illumination system, in accordance with certain embodiments of the present disclosure.

FIG. 7 is a block diagram schematically illustrating a platform 700 employing the disclosed laser illumination system, in accordance with certain embodiments of the present disclosure. In some embodiments, platform 710 may be hosted on, or otherwise be incorporated into an autonomous mobile vehicle, such as, for example, the subsurface object detection system 110, illustrated in FIG. 1, or any other suitable platform or application.

In some embodiments, platform 710 may comprise any combination of a processor 720, a memory 730, an input/output (I/O) system 760, a user interface 762, a display element 764, a storage system 770, laser illumination system 120, and optical receiver system 740. As can be further seen, a bus and/or interconnect 790 is also provided to allow for communication between the various components listed above and/or other components not shown. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor, a graphics processing unit, or hardware accelerator, to assist in control and processing operations associated with platform 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently-developed platform.

I/O system 760 may be configured to interface between various I/O devices and other components of platform 700. I/O devices may include, but not be limited to, user interface 762 and display element 764. User interface 762 may include other devices (not shown) such as a touchpad, keyboard, mouse, microphone and speaker, trackball or scratch pad, and camera. I/O system 760 may include a graphics subsystem configured to perform processing of images for rendering on the display element 764. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 700.

It will be appreciated that in some embodiments, some of the various components of platform 700 may be combined or integrated in a system-on-a-chip (SoC) architecture. In some embodiments, the components may be hardware components, firmware components, software components or any suitable combination of hardware, firmware or software.

Laser illumination system 120 is configured to generate closely spaced laser beams which can be diverged to illuminate a desired surface area with a desired degree of overlap, as described previously. Laser illumination system 120 may include any or all of the components illustrated in FIGS. 2-4 as described above. These components can be implemented or otherwise used in conjunction with a variety of suitable hardware that is coupled to or that otherwise forms a part of platform 700. Optical receiver system 740 may be configured to receive reflections of the laser illumination from the surface of interest. These reflections, in the form of signals, may then be processed and employed for a variety of purposes including, for example, motion compensation for an autonomous mobile subsurface object detection system. Such processing may be performed, for example, by processor 720.

Various embodiments of platform 700 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein (for example, processing of the received signals associated with the reflected laser illumination) to be implemented. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a laser illumination system comprising: a semi-cylindrical refractive optical block, the optical block including a curved surface and a planar surface; a first laser source to generate a first laser beam directed to the curved surface, wherein the first laser beam enters and exits the optical block parallel to the planar surface and offset from the planar surface; and a second laser source to generate a second laser beam directed to the curved surface, wherein the second laser beam enters the optical block at a critical angle relative to the planar surface, the critical angle causing total internal reflection of the second laser beam along the planar surface, such that the second laser beam exits the optical block parallel to, and separated from, the first laser beam exiting from the optical block, the separation based on the offset of the first laser beam from the planar surface.

In some cases, the system further comprises a mounting mechanism configurable to adjust the position of the first laser source causing the offset of the first laser beam from the planar surface to be adjusted such that the separation is a desired separation. In some such cases, the desired separation is less than a diameter of the first laser beam or the second laser beam.

In some cases, the system further comprises a first diverging lens to diverge the first laser beam exiting the optical block and a second diverging lens to diverge the second laser beam exiting the optical block. In some such cases the divergence is in the range of 15 to 35 degrees. In some such cases, the diverged first laser beam illuminates a first surface area and the diverged second laser beam illuminates a second surface area, the first surface area overlapping the second surface area by an overlap percentage in the range of zero to 100 percent. In some such cases, the first surface area and the second surface area are both associated with a length dimension and a width dimension, the length dimension in the range of 0.5 meters to 1.0 meters, and the width dimension in the range of 1.0 meters to 2.0 meters.

Another example embodiment of the present disclosure provides a laser illumination system comprising: a semi-cylindrical refractive optical block, the optical block including a curved surface and a planar surface; a first laser source to generate a first laser beam directed to the planar surface, wherein the first laser beam enters the optical block at a first angle that exceeds a critical angle, relative to the planar surface, the critical angle causing total internal reflection, such that the first laser beam is refracted through and exits the optical block; and a second laser source to generate a second laser beam directed to the curved surface, wherein the second laser beam enters the optical block at a second angle that exceeds the critical angle, relative to the planar surface, such that the second laser beam is reflected off the planar surface and exits the optical block parallel to, and separated from, the first laser beam exiting from the optical block, the separation based on a location of the entry of the first laser beam into the optical block.

In some cases, the system further comprises a mounting mechanism configurable to adjust the position of the first laser source to select the location of the entry of the first laser beam into the optical block such that the separation is a desired separation. In some such cases, the desired separation is less than a diameter of the first laser beam or the second laser beam.

In some cases, the system further comprises a first diverging lens to diverge the exiting first laser beam and a second diverging lens to diverge the exiting second laser beam. In some such cases, the divergence is in the range of 15 to 35 degrees. in some such cases, the diverged first laser beam illuminates a first surface area and the diverged second laser beam illuminates a second surface area, the first surface area overlapping the second surface area by an overlap percentage in the range of zero to 100 percent. In some such cases, the first surface area and the second surface area are both associated with a length dimension and a width dimension, the length dimension in the range of 0.5 meters to 1.0 meters, and the width dimension in the range of 1.0 meters to 2.0 meters.

Another example embodiment of the present disclosure provides a method for laser illumination comprising: directing a first laser beam to a curved surface of a semi-cylindrical refractive optical block, the optical block comprising the curved surface and a planar surface, wherein the first laser beam enters and exits the optical block parallel to the planar surface and offset from the planar surface; and directing a second laser beam to the curved surface, wherein the second laser beam enters the optical block at a critical angle relative to the planar surface, the critical angle causing total internal reflection of the second laser beam along the planar surface, such that the second laser beam exits the optical block parallel to, and separated from, the first laser beam exiting from the optical block, the separation based on the offset of the first laser beam from the planar surface.

In some cases, the method further comprises adjusting the offset of the first laser beam from the planar surface such that the separation is a desired separation. In some such cases, the desired separation is less than a diameter of the first laser beam or the second laser beam.

Another example embodiment of the present disclosure provides a method for laser illumination comprising: directing a first laser beam to a planar surface of a semi-cylindrical refractive optical block, the optical block comprising the planar surface and a curved surface, wherein the first laser beam enters the optical block at a first angle that exceeds a critical angle, relative to the planar surface, the critical angle causing total internal reflection, such that the first laser beam is refracted through and exits the optical block; and directing a second laser beam to the curved surface, wherein the second laser beam enters the optical block at a second angle that exceeds the critical angle, relative to the planar surface, such that the second laser beam is reflected off the planar surface and exits the optical block parallel to, and separated from, the first laser beam exiting from the optical block, the separation based on a location of the entry of the first laser beam into the optical block.

In some cases, the method further comprises adjusting the first laser beam to select the location of the entry of the first laser beam into the optical block such that the separation is a desired separation. In some such cases, the separation is less than a diameter of the first laser beam or the second laser beam.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A laser illumination system comprising:
a semi-cylindrical refractive optical block, the optical block including a curved surface and a planar surface;
a first laser source to generate a first laser beam directed to the curved surface, wherein the first laser beam enters and exits the optical block parallel to the planar surface and offset from the planar surface; and
a second laser source to generate a second laser beam directed to the curved surface, wherein the second laser beam enters the optical block at a critical angle relative to the planar surface, the critical angle causing total internal reflection of the second laser beam along the planar surface, such that the second laser beam exits the optical block parallel to, and separated from, the first laser beam exiting from the optical block, the separation based on the offset of the first laser beam from the planar surface.

2. The system of claim 1, further comprising a mounting mechanism configurable to adjust the position of the first laser source causing the offset of the first laser beam from the planar surface to be adjusted such that the separation is a desired separation.

3. The system of claim 2, wherein the desired separation is less than a diameter of the first laser beam or the second laser beam.

4. The system of claim 1, further comprising a first diverging lens to diverge the first laser beam exiting the optical block and a second diverging lens to diverge the second laser beam exiting the optical block.

5. The system of claim 4, wherein the divergence is in the range of 15 to 35 degrees.

6. The system of claim 4, wherein the diverged first laser beam illuminates a first surface area and the diverged second laser beam illuminates a second surface area, the first surface area overlapping the second surface area by an overlap percentage in the range of zero to 100 percent.

7. The system of claim 4, wherein the first surface area and the second surface area are both associated with a length dimension and a width dimension, the length dimension in the range of 0.5 meters to 1.0 meters, and the width dimension in the range of 1.0 meters to 2.0 meters.

8. A method for providing laser illumination, the method comprising:
directing a first laser beam to a curved surface of a semi-cylindrical refractive optical block, the optical block comprising the curved surface and a planar surface, wherein the first laser beam enters and exits the optical block parallel to the planar surface and offset from the planar surface; and directing a second laser beam to the curved surface, wherein the second laser beam enters the optical block at a critical angle relative to the planar surface, the critical angle causing total internal reflection of the second laser beam along the planar surface, such that the second laser beam exits the optical block parallel to, and separated from, the first laser beam exiting from the optical block, the separation based on the offset of the first laser beam from the planar surface.

9. The method of claim 8, further comprising adjusting the offset of the first laser beam from the planar surface such that the separation is a desired separation.

10. The method of claim 9, wherein the desired separation is less than a diameter of the first laser beam or the second laser beam.

* * * * *